Dec. 28, 1926.

J. M. WEED

ALTERNATING CURRENT ARC WELDING

Filed June 2, 1926

1,612,084

Inventor:
James M. Weed,
by
His Attorney.

Patented Dec. 28, 1926.

1,612,084

UNITED STATES PATENT OFFICE.

JAMES M. WEED, OF BALLSTON LAKE, NEW YORK, ASSIGNOR TO GENERAL ELECTRIC COMPANY, A CORPORATION OF NEW YORK.

ALTERNATING-CURRENT ARC WELDING.

Application filed June 2, 1926. Serial No. 113,314.

My invention relates to metal working by means of the electric arc and particularly to arc welding, cutting or repairing with alternating current.

It is more difficult to operate with an alternating current arc than with a direct current arc because of the instability of an alternating current arc. This instability of the alternating current arc is due largely to the cooling of the gaseous arc path during the time when the current is reversing. It has already been proposed to use higher frequencies for alternating current arc welding than those ordinarily used for electric power applications, in order to reduce the time during which cooling of the arc path may take place between the half waves of current, thus obtaining greater arc stability. The higher the frequency, wave shapes being the same, the more quickly does the current change from a value in one direction sufficient to maintain the conductivity of the arc path to a corresponding value in the reverse direction and the interval of time in which cooling of the arc path may occur is shorter with higher frequency.

The purpose of the present invention is to secure a quick reversal of the welding current corresponding to a much higher frequency when using the frequencies ordinarily used for electric power. This is accomplished by means of a more or less rectangular wave shape of current which may be produced by inserting in the arc circuit two iron core reactors supplied with direct current excitation, the excitation being carried beyond the saturation point of the reactor cores. These reactors are placed in series in the arc circuit and direct current magnetization is so applied that its effect is in opposite directions in the two cores with respect to the alternating current magnetization. This result may be secured by reversing one winding of either the alternating current or direct current circuits on one of the two reactors. The reactors will be adjusted for different values of current in the arc circuit by varying the direct current excitation.

Figure 1:
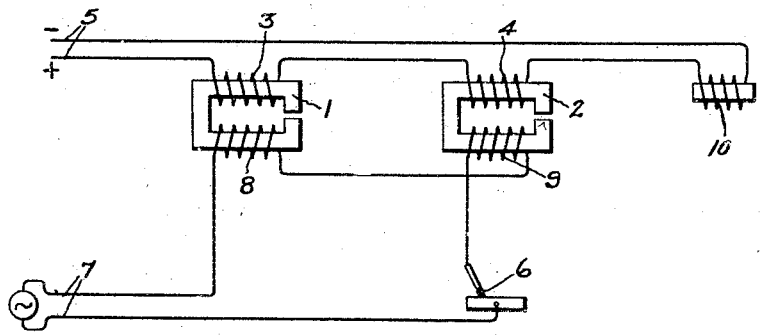
Figure 2:
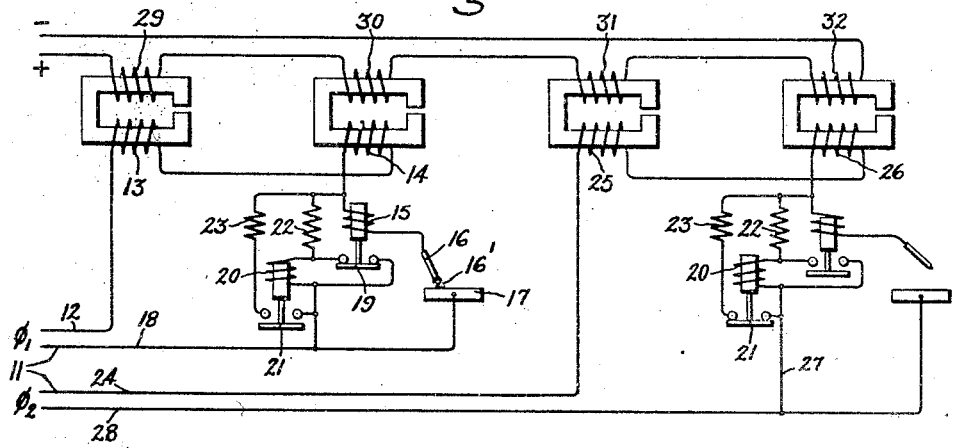
Figure 3:
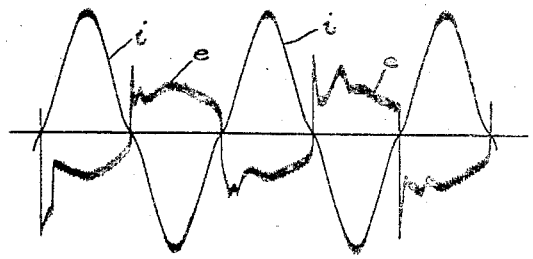

In the drawing, Fig. 1 diagrammatically represents one form of apparatus for carrying my invention into effect, and Fig. 2 represents a modification thereof. Fig. 3 is a reproduction of an oscillograph record of the current and voltage of the usual arc in an alternating current inductive circuit, and Fig. 4 is a like representation of the current and voltage of the arc according to my invention.

Referring to Fig. 3, it will be seen that generally the voltage waves $e$ are roughly rectangular but rise to a relatively high value at the point where the current reverses. The peaks at the initial corners are occasioned by the high resistance due to the cooling of the arc path when the current reverses. These voltage waves are typical of the ordinary alternating current arc. The current waves $i$, of a general triangular shape, are likewise typical of the ordinary alternating current arc. Although shown in phase opposition, it is to be understood that the current and voltage are in phase.

Figure 4:
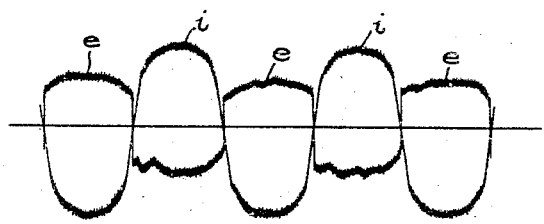

Fig. 4 is a reproduction of the current and voltage graph of an arc maintained in accordance with my invention. Although here shown in phase opposition, it is to be understood that the current and voltage are in phase. It will be noted that the voltage waves are flat topped but substantially free from the initial peaks and the irregularities appearing in the voltage waves shown in Fig. 3. The current waves are likewise flat, more or less rectangular waves with abrupt reversals between positive and negative half waves.

In Fig. 1, I have shown means for securing a quick reversal of the current according to my invention. The two iron core reactors 1 and 2, inserted in series in the arc circuit, are provided with coils 3 and 4 which are supplied with direct current from a suitable source 5. The arc 6 is maintained by a suitable source of alternating current 7 through suitable leads and coils 8 and 9 on reactors 1 and 2. It will be noted that coil 9 on reactor 2 produces a magnetization which is opposite in effect with respect to the direct current magnetization from that produced by coil 8 on reactor 1. When a substantially sinusoidal electromotive force is impressed on the welding circuit thus arranged, a flattened current wave is produced which reverses abruptly. The graph of such a current wave is shown in Fig. 4 to which reference has already been made. At the same time a double frequency electromotive force wave is induced by the reactors in the direct current circuit which results in a double frequency current superposed upon the direct current of this circuit. The tendency of this double frequency current is to neutralize the effect of the reactances in producing the flattened current wave that I use to maintain the arc. I, therefore, insert the reactance 10 in the direct current circuit to choke out this double frequency current.

Even with this auxiliary reactance, the double frequency current is not entirely eliminated from the direct current circuit. One method of entirely eliminating this double frequency current consists in using two reactor sets such as shown in Fig. 1, the direct current windings of the two sets being in series and the alternating current supply for the two sets being obtained from opposite phases of a quarter phase circuit. With this arrangement, the voltages induced in the direct current windings of one set will be in direct opposition to those induced in the other set. This results from the fact that the induced voltages are of double frequency, and, since the two sets are supplied from a quarter phase circuit, the induced voltages are at 180° to each other, and, consequently, neutralize each other. This arrangement would normally involve the operation of two arcs at the same time, each using current from one phase of the two-phase circuit, but the operation of one of the arcs will not be interfered with by interruptions in the operation of the other, provided that the second welding arc is interrupted by short circuiting rather than by open circuiting.

In Fig. 2, I have shown a modification of my invention in which I avail myself of such an arrangement as has just been described. Two welding sets are shown, each supplied by one phase of a two-phase source 11. The left hand arc 16' is maintained by phase $\phi_1$, through lead 12, reactor coils 13 and 14, relay winding 15, electrode 16, work 17 and conductor 18. During normal operation of the arc, winding 15 is excited, maintaining switch 19 in its closed position and thereby short circuiting coil 20 of switch 21. An impedance 22 is inserted in this circuit to limit the current in shunt to the arc. When the arc 16' is interrupted, winding 15 is de-energized and switch 19 opens the short circuit about the coil 20. Coil 20 is then energized, closing switch 21, which completes a circuit in shunt to the arc through a load resistance 23, chosen of such a value as to be the equivalent of the arc 16'. In this manner a flow of current is maintained in this phase circuit, even though the arc is interrupted.

The conditions maintained when one arc is interrupted are shown in Fig. 2. An arc is being maintained by the left hand set, while the arc of the right hand set has been interrupted. The circuit in the set to the right is as follows: from lead 24 of phase $\phi_2$, through reactor coils 25 and 26, resistance 23, switch 21, and lead 27 back to the other side of the phase circuit through lead 28. Sufficient current also flows through resistance 22 and coil 20 to maintain switch 21 in its closed position. The direct current excitation for the reactors in these two circuits is supplied by coils 29, 30, 31 and 32, all of which are connected in series to a suitable source of direct current. The double frequency voltage induced in coils 29 and 30 of phase $\phi_1$ is completely neutralized by the double frequency current induced in coils 31 and 32 of phase $\phi_2$, since, as before pointed out, the two are in phase opposition.

It is apparent that this system just disclosed is but one of many where the direct current windings of several sets are connected in series and the alternating current circuits are supplied from sources differing in phase by an amount such that their double frequency voltages induced in the direct current circuit will neutralize each other. The embodiments of the invention illustrated and described herein have been selected for the purpose of clearly setting forth the principles involved, and I aim to cover by the appended claims all modifications which fall within the scope of my invention.

What I claim as new and desire to secure by Letters Patent of the United States, is:

1. The method of arc welding which comprises supplying to the arc an alternating current of substantially rectangular wave shape.

2. The method of arc welding which comprises supplying to the arc an alternating current of low frequency with abrupt reversals between positive and negative half waves.

3. The method of arc welding which comprises impressing upon the welding set an electromotive force of substantially sinusoidal wave shape and supplying to the arc a current having a wave shape which changes abruptly from a substantially maximum value in one sense to a substantially maximum value in the opposite sense.

4. In a system comprising two alternating current circuits each including two reactors in series magnetized in opposite directions with respect to the series connected alternating current windings by direct current windings connected in series, the method of eliminating double frequency currents from the direct current circuit which comprises supplying to the alternating current circuits currents having a phase displacement of 90°.

5. In a system comprising two alternating current circuits each including two reactors in series magnetized in opposite directions with respect to the series connected alternating current windings by direct current windings connected in series for the production of low frequency current waves which abruptly change from a substantial value in one sense to a substantial value in the opposite sense, the method of eliminating double frequency currents from the direct current exciting circuit which comprises supplying to the alternating current circuits currents having a phase displacement of 90°.

6. In a system comprising a plurality of alternating current circuits each including two reactors in series magnetized in opposite directions with respect to the series connected alternating current windings of said circuit by direct current windings connected in series, the method of eliminating double frequency currents from the direct current windings which comprises supplying to the alternating current circuits currents differing in phase by an amount such that their double frequency values neutralize each other.

7. A combination for working metals by the alternating current electric arc process comprising a pair of reactors having their windings arranged to be connected in series with the arc and means for magnetizing said reactors comprising a direct current winding on each reactor, said direct and alternating current windings being relatively reversed on the respective reactors.

8. Means for welding metals by the alternating electric arc process comprising a pair of reactors each having a direct current winding and an alternating current winding, the direct and alternating current windings being relatively reversed on the respective reactors, said alternating current windings being connected in series in the welding circuit and said direct current windings being connected in series in a direct current circuit, and a reactive device connected in series in said direct current circuit.

9. An arc welding system comprising a plurality of welding circuits each of which includes a pair of reactors magnetized by direct current in opposite directions with respect to the series connected alternating current windings of said circuit, a source of direct current, means for connecting the direct current magnetizing windings of the reactors of all of said circuits in series with said source, sources of alternating current, differing in phase by an amount such that their double frequency values neutralize each other, for supplying said circuits, and switching means in each circuit for maintaining its continuity arranged to insert an equivalent resistance when the arc in said circuit is interrupted.

In witness whereof, I have hereunto set my hand this 29th day of May, 1926.

JAMES M. WEED.